United States Patent [19]

Mizuno

[11] Patent Number: 5,684,295
[45] Date of Patent: *Nov. 4, 1997

[54] SOLID STATE IMAGE PICKUP DEVICE HAVING DUAL INTEGRATOR

[75] Inventor: Seiichiro Mizuno, Hamamatsu, Japan

[73] Assignee: Hamamatsu Photonics K.K., Hamamatsu, Japan

[*] Notice: The term of this patent shall not extend beyond the expiration date of Pat. No. 5,424,530.

[21] Appl. No.: 420,159

[22] Filed: Apr. 11, 1995

Related U.S. Application Data

[63] Continuation of Ser. No. 212,772, Mar. 15, 1994, Pat. No. 5,424,530.

[30] Foreign Application Priority Data

Mar. 19, 1993 [JP] Japan ................................. 5-060234

[51] Int. Cl.$^6$ ........................................................ H01J 40/14
[52] U.S. Cl. ................................. 250/214 R; 250/214.1; 327/514
[58] Field of Search ............................ 250/214.1, 214 R, 250/201.6, 208.1; 348/294–297, 302–308; 330/59, 310; 327/515, 514

[56] References Cited

U.S. PATENT DOCUMENTS

| | | | |
|---|---|---|---|
| 4,237,377 | 12/1980 | Sansum | 250/214 R |
| 4,642,451 | 2/1987 | Tsunekawa | 250/205 |
| 5,027,217 | 6/1991 | Oshio et al. | 348/297 |
| 5,272,328 | 12/1993 | Furukawa | 250/208.1 |
| 5,281,860 | 1/1994 | Krenik et al. | 327/336 |
| 5,322,994 | 6/1994 | Uno | 250/208.1 |

FOREIGN PATENT DOCUMENTS

| | | |
|---|---|---|
| 4031453 | 4/1992 | Germany. |
| 59-142412 | 8/1984 | Japan. |
| 59-184562 | 10/1984 | Japan. |
| 62-237411 | 10/1987 | Japan. |
| 62-245103 | 10/1987 | Japan. |

*Primary Examiner*—Que Le
*Attorney, Agent, or Firm*—Cushman Darby & Cushman IP Group of Pillsbury Madison & Sutro LLP

[57] ABSTRACT

A solid state image pickup device which performs optical measurement achieving high signal to noise ratio by separating light to be measured from unnecessary noise components comprises a photosensitive unit comprising a photoelectric converting function, a first integrator for either integrating or not integrating a signal generated on the photosensitive unit in a first capacitor connected between an input and output thereof by a first reset signal, a second integrator for either integrating or not integrating a signal in a third capacitor by a second reset signal, a switching device and a second capacitor connected in series between an output of the first integrator and an input of the second integrator, a counter circuit comprising a counting up function and a counting down function, and a timing control circuit for prior to the measurement of the light to be measured, making the first integrator to perform integration by controlling the first reset signal, setting the second integrator in non-integration state by controlling the second reset signal, setting the switching device to on, exposing on the photosensitive unit, accumulating charges in the first and second capacitors until an output voltage of the first integrator reaches a predetermined voltage, making the counter circuit to count up elapsed time, next, in a case of measuring light to be measured, making the first integrator to perform integration by controlling the first reset signal, setting the second integrator in integration state by the second reset signal, further, setting the switching device to on, exposing on the photosensitive unit, making the counter circuit to count down from the counted value of the elapsed time, at a point of the counted value reaching zero, turning off the switching device, making the second integrator not to perform integration, thereby an output signal of the second integrator is a component of the light to be measured.

7 Claims, 5 Drawing Sheets

SOLID STATE IMAGE PICKUP DEVICE HAVING DUAL INTEGRATOR

This is a continuation of application Ser. No. 08/212,772, filed Mar. 15, 1994, now U.S. Pat. No. 5,424,530.

BACKGROUND OF THE INVENTION

1. Field of the Invention

The present invention relates to a solid state image pickup device, and relates to the solid state image pickup device which eliminates noise components, offset components or unnecessary background image components from an obtained image signal to obtain only the necessary image components.

2. Related Background Art

In recent years, with the spread of image processing techniques, various kinds of image pickup devices as a main device having a photoelectric conversion function have been developed. A charge transfer device represented by a CCD or a BBD, a MOS type image pickup device, and a position sensitive detector are examples of the image pickup devices.

In a case that only a certain object is intended to be taken by the image pickup device, not only light from the certain object but also light from its background are incident on the photosensitive unit, so that the light from the background is included in the image signal as noise components. Therefore, it is a problem that the real image signal of the certain object cannot be obtained.

The conventional solid state image pickup device employs some technique to eliminate noise components including offset components and noise components generated by the photosensitive unit itself (Japanese Patent Laid-Open No. 59-142412 (142412/1984)).

However, it is not practical to use as the solid state image pickup device.

SUMMARY OF THE INVENTION

It is an object of the present invention to provide an image pickup device with simple construction which can perform measurements accurately. In order to achieve the object, an image pickup device of the present invention which performs optical measurement achieving high signal to noise ratio by separating light to be measured from unnecessary noise components, comprises a photosensitive unit comprising a photoelectric converting function, a first integrator for either integrating or not integrating a signal generated on the photosensitive unit in a first capacitor connected between an input and output thereof by a first reset signal, a second integrator for either integrating or not integrating a signal in a third capacitor by a second reset signal, a switching device and a second capacitor connected in series between an output of the first integrator and an input of the second integrator, a counter circuit comprising a counting up function and a counting down function, and a timing control circuit for prior to the measurement of the light to be measured, making the first integrator to perform integration by controlling the first reset signal, setting the second integrator in non-integration state by controlling the second reset signal, setting the switching device to on, exposing on the photosensitive unit, accumulating charges in the first and second capacitor until an output voltage of the first integrator reaches a predetermined voltage, making the counter circuit to count up elapsed time, next, in a case of measuring light to be measured, making the first integrator to perform integration by controlling the first reset signal, setting the second integrator in integration state by the second reset signal, further, setting the switching device to on, exposing on the photosensitive unit, making the counter circuit to count down from the counted value of the elapsed time, at a point of the counted value reaching zero, turning off the switching device, making the second integrator not to perform integration, thereby an output signal of the second integrator is a component of the light to be measured.

Here, the solid state image pickup device may comprise a function for notifying of an unusual condition with an overflow signal when counting ability exceeds its capability of counting up.

According to the solid state image pickup device of the present invention having such a structure, prior to the measurement of the light to be measured, the counted value equivalent to the intensity of light, e.g., the background light is held in the counter circuit and charges equivalent to the intensity of the background light are held in the second capacitor. Next, in a case of measuring light to be measured, while a counting down operation is performed from the counted value held in the counter circuit until it reaches zero, charges to be accumulated in the first integrator and charges accumulated in the second capacitor are coupled, so that the background light components are eliminated, whereby the output of the second integrator is to correspond to the intensity of light of the specific area. Therefore, unnecessary light components (e.g., background light) are eliminated, and the signal corresponding to the light of the specific area (i.e., light to be measured) intended to be measured is obtained as the above voltage value.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DETAILED DESCRIPTION OF THE PREFERRED EMBODIMENTS

The embodiments of the present invention will be described hereunder with reference to the accompanying drawings. The embodiments relate to a position sensitive detector (hereinafter called PSD) for measuring distance.

First, referring to FIG. 1, the PSD will be explained below.

Figure 1:
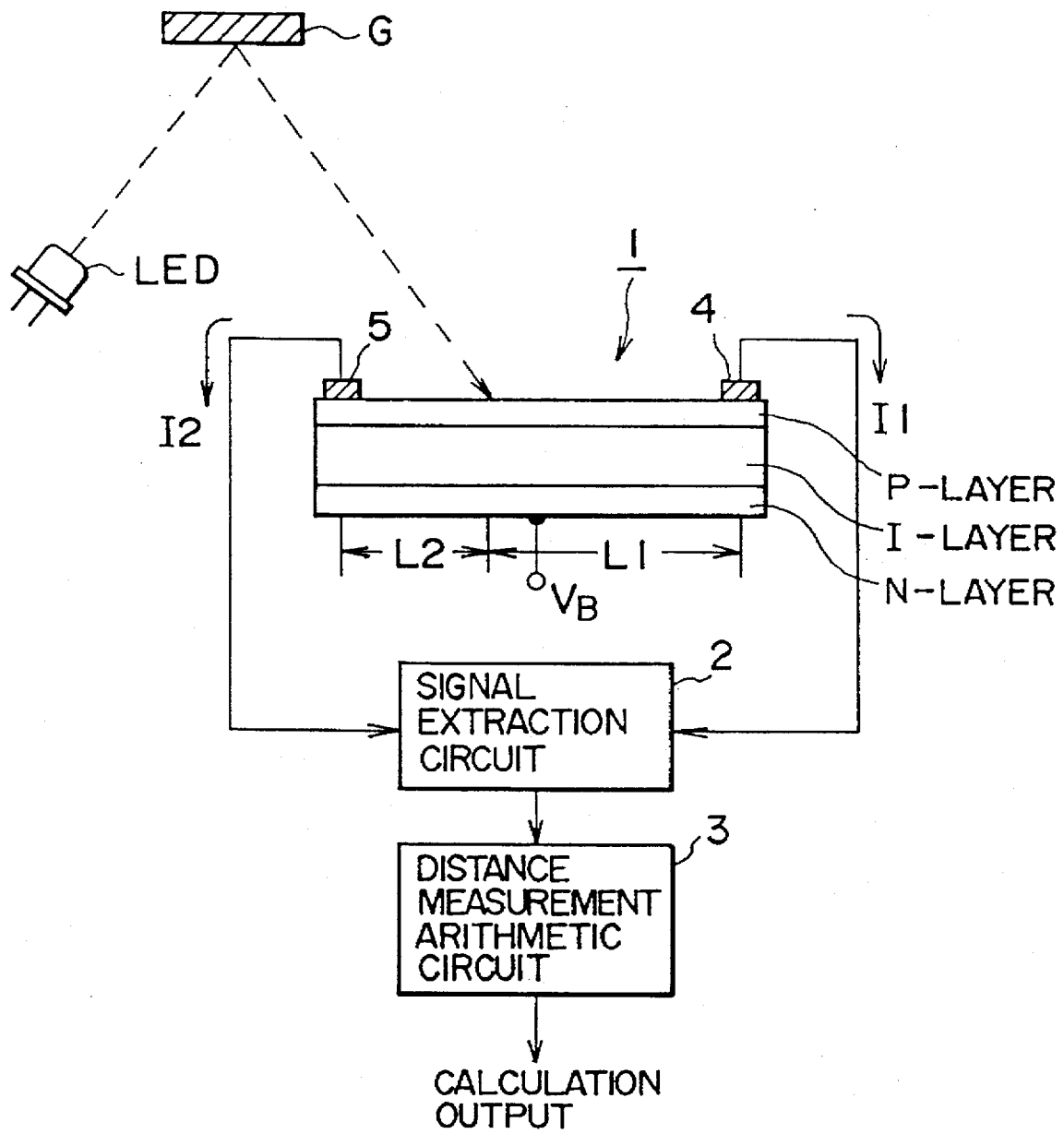
FIG. 1 is a configuration of a position sensitive detector (PSD).

As shown in FIG. 1, the PSD for measuring distance comprises a photosensitive unit 1 including three silicon semiconductor layers; a P-layer, an I-layer, and an N-layer, a signal extraction circuit 2 for eliminating unnecessary components such as noise from a photoelectric conversion signal to extract necessary signal components, and a distance measurement arithmetic circuit 3 for calculating distance to an object based on an extracted signal.

Here, one pair of output electrodes 4 and 5 are formed on both ends of the P-layer of the photosensitive unit 1. A predetermined bias voltage $V_B$ is applied at the position where the distance from the output electrodes 4 and 5 on the N-layer is equal. The surface of the P-layer is a light incident plane. Then, when light is incident on the P-layer, photoelectric currents are generated by photoelectric conversion effect. The photoelectric currents I1 and I2 which are divided in accordance with the ratio of the distance L1 from the light incident position to the electrode 4 and the distance L2 from the light incident position to the electrode 5 are applied to the signal extraction circuit 2 through the respective electrodes 4 and 5.

Moreover, a light emitting diode LED for emitting a spotlight to an object G is placed apart from the photosensitive unit 1. The P-layer of the photosensitive unit 1 receives a spotlight reflected at the object G (hereinafter called reflected spotlight). Therefore, the principle of triangle distance measurement can be applied to this structure. In other words, since the distance from the light emitting diode LED to the object G and the position of the reflected spotlight incident on the P-layer (i.e., L1 and L2) are proportional to each other, the distance measurement arithmetic circuit 3 performs the distance calculation based on the photoelectric currents I1 and I2, so that the distance to the object G is calculated.

However, since the P-layer has a wider area than the incident area of the reflected spotlight, the photoelectric currents I1 and I2 include not only the reflected spotlight but also the background light and other noise components. For that reason, if only the distance arithmetic is performed, accuracy of the distance measurement is lower because of the background light and noise components.

Thus, a solid state image pickup device of the present invention comprises a noise elimination circuit described hereinafter.

Figure 2:
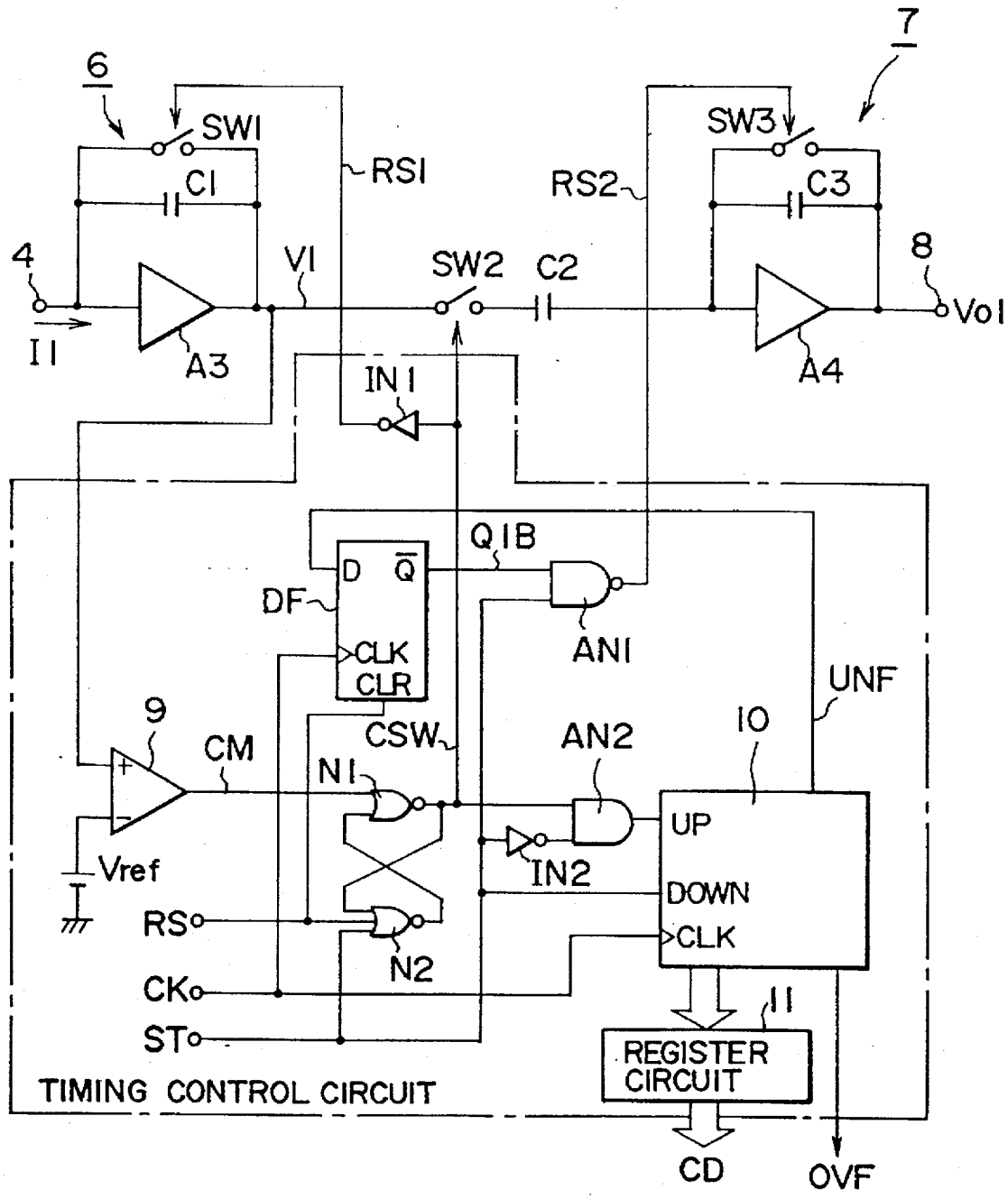
FIG. 2 is a circuit diagram of a noise elimination circuit according to an embodiment of the present invention.

Referring to FIG. 2, a noise elimination circuit connected on the side of the output electrode 4 will be explained. An integrator 6 is connected to the output electrode 4 and comprises an amplifier A3 for amplifying a photoelectric current I1 applied from a photosensitive unit 1 through the output electrode 4, a first capacitor C1 and a first switching device SW1, which are both connected in parallel between an input and output of the amplifier A3. Therefore, in a case that the first switching device SW1 is off by a logic "L" first reset signal RS1, the photoelectric current I1 is charged in the first capacitor C1, and in a case that the first switching device SW1 is on by a logic "H" first reset signal RS1, the charges in the first capacitor C1 are discharged. Here, in order to set an integral operation time of the integrator 6 to a few μ seconds, a capacitance of the first capacitor C1 is set to a few picofarads.

The output of the integrator 6 (which is the output of the amplifier A3) is connected to an integrator 7 through a second switching device SW2 and a second capacitor C2. The integrator 7 comprises an amplifier A4, and a third capacitor C3 and a third switching device SW3, which are both connected in parallel between an input and output of the amplifier 4. Then, an output of the amplifier A4 is connected to an output terminal 8. Considering the equilibrium of a margin of the operational speed and a margin of the noise for the overall circuit, the second and third capacitors C2 and C3 have the same capacitance of approximately 1 pF. Further, the second switching device SW2 is switched to on by a logic "H" switching signal CSW and switched to off by a logic "L" switching signal CSW. The integrator 7 performs the integral operation when the third switching device SW3 is off by the logic "L" second reset signal RS2, and on the contrary, it stops the integral operation when the switching device SW3 is on by the logic "H" second reset signal RS2.

Moreover, in order to control an on/off of these switching devices, a timing control circuit is incorporated. A comparator 9 is connected to an output of the integrator 6, and the comparator 9 compares an integral signal $V_1$ which is an output from the integrator 6 with a reference voltage $V_{ref}$ and outputs a logic "H" comparison signal CM if the integral signal V1 exceeds the reference voltage $V_{ref}$. Here, the reference voltage $V_{ref}$ is set in advance below the maximum voltage which the integral signal V1 may obtain.

An output of the comparator 9 is connected to one of the inputs of a NOR gate N1. The NOR gate N1 and the other NOR gate N2 constitute an RS flip-flop circuit. A reset signal RS and a start signal ST are applied to the other two inputs of the NOR gate N1. The NOR gate N1 generates the above switching signal CSW. Further, the inverter circuit IN1 generates the first reset signal RS1 by inverting the switching signal CSW.

In a D flip-flop DF, an underflow signal UNF from a counter circuit 10 which will be explained hereinafter is applied to a data input D, and a comparatively high frequency synchronized clock signal CK is applied to a clock input CLK, and the reset signal RS is applied to a reset input CLR. A NAND gate AN1 generates a second reset signal RS2 by multiplying an inverting output Q1B of the D flip-flop DF by the start signal ST.

An AND gate AN2 multiplies the start signal applied through the invertor circuit IN2 by the switching signal CSW and provides the output signal thereof to a counting up control input UP of the counter circuit 10. Further, in the counter circuit 10, the start signal ST is applied to the counting down control input DOWN and the synchronized clock signal CK is applied to the clock input CLK. Then, when the counting up control input UP is a logic "H" and the counting down control input DOWN is a logic "L", the counter circuit 10 synchronizes with the synchronized clock signal CK to perform the counting up operation, and concurrently, holds and outputs data of the counted value CD in the register circuit. Further, if the condition is overflow, the counter circuit 10 outputs overflow data OVF. On the other hand, when the counting up control input DOWN is a logic "H", the counter circuit 10 synchronizes with the synchronized clock signal CK to perform the counting down operation, and concurrently, outputs data of the counted value CD through the register circuit 11, and if the condition is underflow, the counter circuit 10 outputs underflow data UNF.

Since the noise elimination circuit with such a structure is also placed at the output electrode 5 of the photosensitive unit 1, the output signal $V_{o1}$ corresponding to the photoelectric current I1 generated in the output electrode 4 is an output from the output terminal 8 as shown in FIG. 1, and concurrently, the output signal $V_{o2}$ corresponding to the photoelectric current I2 generated in the output electrode 5 is also an output. These output signals $V_{o1}$ and $V_{o2}$ are applied to a distance measurement arithmetic circuit 3 as shown in FIG. 1.

Figure 3:
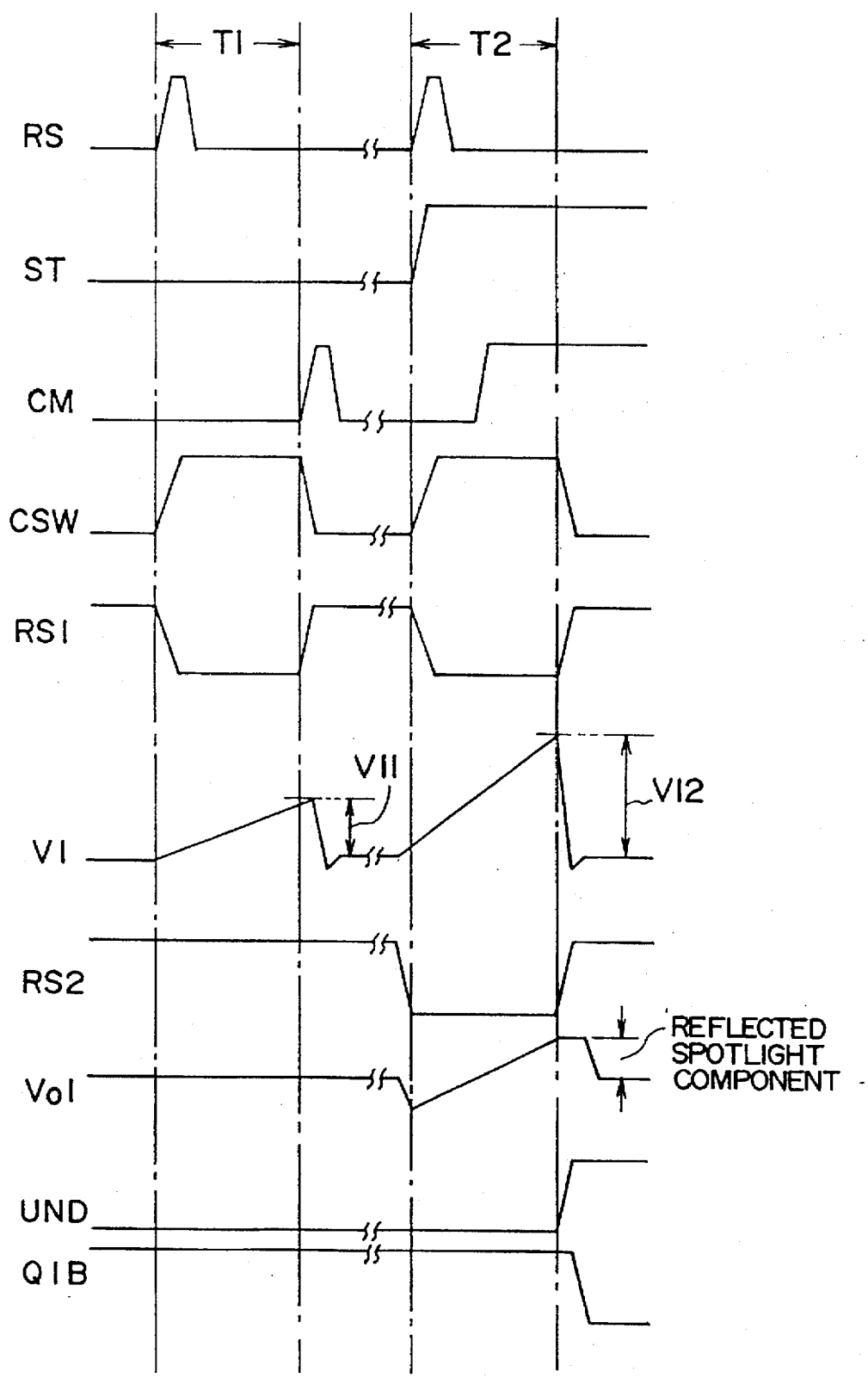
FIG. 3 is a time chart showing an operation of a noise elimination circuit according to an embodiment of the present invention.

Next, referring to a time chart in FIG. 3, the operations of the noise elimination circuit with such a structure will be explained. Here, the noise elimination circuit generates the output signals $V_{O1}$ and $V_{O2}$ in which noise components such as the background light, and offset are eliminated by performing the process twice over the first cycle T1 and the second cycle T2 as shown in FIG. 3. The operation of the noise elimination circuit connected to the output electrode 4 in FIG. 1 will be explained herein after.

First, in the cycle T1, a start signal ST stays at the logic "L" and the light emitting diode LED shown in FIG. 1 does not emit light. Once this condition is set, the second reset signal RS2 is always the logic "H", so that the third switching device SW3 is always on and charging to the third capacitor C3 is stopped.

Next, at the starting point t1, the reset signal RS instantaneously becomes a logic "H", and the switching signal CSW is inverted to the logic "H". Synchronizing these, the first reset signal RS1 is inverted to the logic "L". Thus, the first switching device SW1 is off and the second switching device SW2 is on. Further, since the counting up control input UP is the logic "H" and the counting down control input DOWN is the logic "L", the counter circuit 10 starts counting up.

As a result, in the cycle T1, only the background light is incident on the photosensitive unit 1, and since the generated photoelectric current I1 is charged in the first capacitor C1 by the integrator 6, the integral signal V1 is gradually increased and the counter circuit 10 counts the charging period.

And then, if the integral signal $V_1$ exceeds the reference voltage $V_{ref}$ at some point t2, an output CM of the comparator becomes a logic "H". Then, synchronizing with this, the switching signal CSW of a NOR gate N1 which constitutes the RS flip-flop becomes the logic "L", and the first reset signal RS1 becomes a logic "H", so that the first switching device SW1 and the second switching device SW2 are switched on and off respectively, and the integral operation of the integrator 6 is stopped. Further, since the counting up control input UP becomes a logic "L", the counter circuit 10 stops counting up.

Accordingly, the duration until the integral signal V1 exceeds the reference voltage $V_{ref}$ is T1. Assuming that the voltage of the integral signal of the integrator 6 at the point t2 is V11 and the current applied from the output electrode 4 with the background light components is $I_d$, since I1=$I_d$ $$V11 = I_d \cdot T1/C1 \qquad (1)$$

is obtained. Then, the second capacitor C2 holds the voltage V11.

Further, the counter circuit 10 holds the counted value CD1 equivalent to the time T1 and makes the register circuit 11 hold the same value. Here, the remarkable point is that in a case that the light intensity of the background light incident on the photosensitive unit 1 is too weak, the period of time that the integral signal V1 exceeds the reference voltage $V_{ref}$ is long, and the counter circuit 10 holds the counted value CD indicating the long period of time T1, and on the contrary, in a case that the light intensity of the background light incident on the photosensitive unit 1 is too strong, the period of time that the integral signal V1 exceeds the reference voltage $V_{ref}$ is short, and the counter circuit 10 holds the counted value CD indicating the short period of time T1. Accordingly, the counted value CD held in the counter circuit 10 is the value proportional to the light intensity of the background light.

Moreover, if the light intensity of the background light incident on the photosensitive unit 1 is extremely weak and before the integral signal V1 exceeds the reference voltage $V_{ref}$, the counter circuit 10 exceeds its counting ability, the overflow signal OVF is generated to notify the failure of the measurement to outside components.

Next, the start signal ST is inverted to a logic "H" at some point t3 and simultaneously the reset signal RS becomes the logic "H". Further, the light emitting diode LED in FIG. 1 emits the spotlight. Accordingly, the switching signal CSW of the NOR gate N1 constituting the RS flip-flop circuit is inverted to the logic "H", and synchronizing with this, the first reset signal RS1 is inverted to the logic "L", and the second signal RS2 is inverted to the logic "H". Further, the counting up control input UP and the counting down control input DOWN become the logic "L" and the logic "H" respectively, so that the counter circuit 10 starts counting down from the held value (the value CD counted over the time period of T1).

Then, as a result of such switching operations, the integrator 6 charges the photoelectric current I1 equivalent to the sum of the background light and the reflected spotlight in the first capacitor C1. The integrator 7 charges the charge difference between the charge of the first capacitor C1 and the charge of the second capacitor C2 in the third capacitor C3 in accordance with the principle of conservation of charge.

When the counted value CD of the counter circuit 10 reaches zero, at the point t4, the underflow signal UNF is inverted to the logic "H", and the inverting output Q1B of the D flip-flop DF is inverted to the logic "L", so that the third switching device SW3 is switched on and the period of time T2 is set. In other words, the period of time from t3 to t4 is T2, and the cycle T2 is set as a result of the counting operation of the counter circuit 10, so that the cycle T1 is equal to the cycle T2.

Here, assuming that the voltage of the integral signal of the integrator 6 at the point t2 is V12 and the current of the reflected spotlight components is $I_{sh}$, since the light intensity of the background light is the same as the one in the cycle T1, the current of the background light components is $I_d$, and I1=$I_d$+$I_{sh}$, the relation $$V12 = (I_{sh}+I_d) \cdot T2/C1 \qquad (2)$$

can be expressed.

Further, the integrator 7 stops the integral operation during the time period T1, and performs the integral operation during the time period T2. Therefore, according to the principle of conservation of charge, charges along with the next equation (3) are held in the second and third capacitors C2 and C3.

$$(V12-V11) \cdot C2 = V_{o1} \cdot C3 \qquad (3)$$

Then, the equations (1) and (2) are substituted into the equation (3), and assuming T=T1=T2, the voltage of the output signal $V_{O1}$ generated at the output terminal 8 can be expressed by the following equation (4).

$$\begin{aligned} V_{o1} &= (V11 - V12) \cdot C2/C3 \\ &= \{(I_{sh}+I_d) \cdot T2 - I_d \cdot T1\}/C1 \cdot C2/C3 \\ &= I_{sh} \cdot T \cdot C2/(C1 \cdot C3) \end{aligned} \qquad (4)$$

Moreover, in this embodiment, since the second and third capacitors have the same capacitance, the equation will be the following.

$$V_{o1} = I_{sh} \cdot T/C1 \tag{5}$$

Further, assuming that cycle of the synchronized clock signal CK is $T_{CK}$ and the counted value in the cycle T1 is N, from next equation (6), the photoelectric current $I_{sh}$ of the reflected spotlight is determined by the following equation.

$$I_{sh} = V_{o1} \cdot C1/(T_{CK} \cdot N) \tag{6}$$

Then, the distance measurement arithmetic circuit 3 calculates the photoelectric current $I_{sh1}$ from the above equation (6) with the voltage $V_{O1}$ which is the output of the noise elimination circuit connected to the output electrode 4, and calculates the photoelectric current $I_{sh2}$ from the above equation (6) with the voltage $V_{O2}$ which is the output of the noise elimination circuit connected to the output electrode 5. Here, since the photoelectric currents $I_{sh1}$ and $I_{sh2}$ are proportional to the position of the reflected spotlight incident on the photosensitive unit 1, based on these photoelectric currents $I_{sh1}$ and $I_{sh2}$, the arithmetic operation is performed, so that the distance to the object G can be determined.

In this embodiment, the PSD for measuring distance was explained but if the photosensitive unit 1 is considered to be one pixel, the present invention can be also applied to a two dimensional solid image pickup device such as a CCD.

COMPARATIVE EXAMPLE

Next, the comparison results between the noise elimination circuit of the present invention and the conventional elimination circuit will be explained. This comparison also relates to the PSD, and the configuration of the PSD is the same as the one shown in FIG. 1. The conventional noise elimination circuit disclosed in "Japanese Laid-Open application No. 59-142412 (142412/1984)" is used to compare. This circuit is also incorporated within the signal extraction circuit 2 placed on both output electrodes 4 and 5 of the photosensitive unit 1 in FIG. 1. In other words, in the above embodiment, only the noise elimination circuit is replaced by the conventional one and others remain the same. In the following comparison, the same devices are represented by the same reference numerals, and the repetitive description of the same devices is omitted.

First, referring to FIG. 4 and FIG. 5, the conventional noise elimination circuit connected to the output electrode 4 in FIG. 1 will be explained. The conventional boise elimination circuit comprises a buffer circuit constituted with a PMOSFET Q1 and an operational amplifier A1 biased by a bias voltage $V_{R1}$. The buffer circuit DC biases the output electrode 4 to the bias voltage $V_{R1}$, amplifies the photoelectric current I1 and outputs it to the node X.

Figure 4:
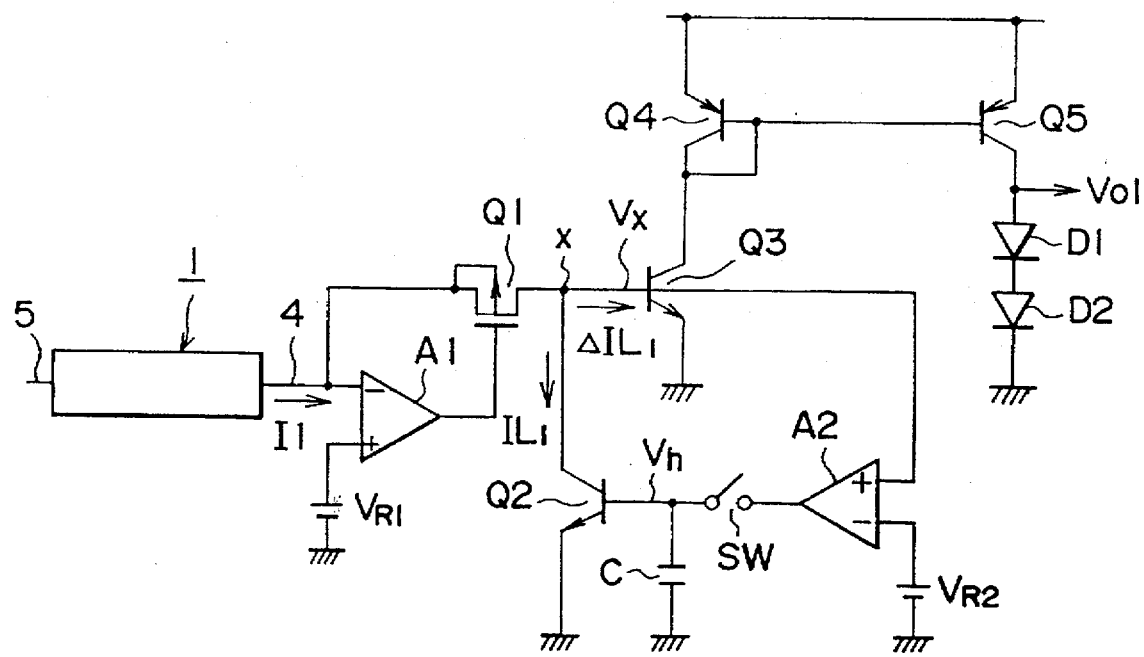
FIG. 4 is a circuit diagram of a conventional noise elimination circuit.

The node X is, as shown in FIG. 4, connected to a collector of an npn transistor Q2, a base of an npn transistor Q3 and a non-inverted input of an operational amplifier A2. A current mirror circuit constituted with pnp transistors Q4 and Q5 is connected to a collector of the npn transistor Q3. Diodes D1 and D2 are connected to a collector of the pnp transistor Q5, and a voltage $V_{O1}$ on both ends of diodes D1 and D2 becomes a signal to the arithmetic circuit 3.

A reference voltage $V_{R2}$ is applied as an inverted input of the operational amplifier A2. An output of the operational amplifier A2 is connected to a base of the npn transistor Q2 through a switching device SW, and a capacitor C is connected between a base of the npn transistor Q2 and ground.

With such a structure, distance measurement is performed in the following procedure. First, the light emitting diode LED is set in the state of non spotlight emission for certain time τ, and concurrently the switching device SW is turned on to receive the background light which includes the object to be measured. At this state, voltage at the node X becomes $V_X$ equivalent to the intensity of the background light, and the operational amplifier A2 calculates the difference between the $V_X$ and the reference voltage $V_{R2}$. Therefore, the capacitor C is charged to the voltage $V_h$ equivalent to the intensity of the background light. The reference voltage $V_{R2}$ is set to eliminate noise components generated from the photosensitive unit 1 itself or others from the voltage $V_X$ at the node X.

Next, the switch SW is turned off after a certain time τ, and the light emitting diode LED is made to emit the spotlight. The light receiving process is performed again for the same period of time as the certain time period τ. Accordingly, the reflected spotlight reflected at the object G and the background light are incident on the photo sensitive unit 1, therefore the photoelectric current I1 becomes the value equivalent to the sum of the background light and the reflected spotlight. Here, since the voltage $V_h$ equivalent to the background light is held in the capacitor C, the current corresponding to the background light in the output current I1 flows into a ground through the npn transistor Q2, and then the voltage $V_X$ at the node X is increased by a voltage equivalent to the reflected spotlight. As a result, the current flowing in the pnp transistor Q5 on the output side of the current mirror circuit increases as the voltage increases. Then, the voltage $V_{O1}$ on both ends of diodes D1 and D2 becomes the voltage equivalent to the intensity of spotlight.

Thus, the voltage $V_{O1}$ which contains only real reflected spotlight components is obtained by holding the voltage $V_h$ equivalent to the background light in the capacitor C in advance and when the reflected spotlight is received, eliminating the background light components with the voltage $V_h$. Here, the same noise elimination circuit is connected to the output electrode 5, so that the background light components are also eliminated from the photoelectric current I2 which is the output of the output electrode 5, and then only real reflected spotlight components are obtained. Further, since the voltages $V_{O1}$ and $V_{O2}$ are proportional to the position of the incident reflected spotlight (i.e., L1 and L2), the distance measurement arithmetic circuit 3 performs the certain arithmetic based on these voltages $V_{O1}$ and $V_{O2}$ to determine the distance to the object G.

Assuming that the electron charge is Q, Boltzmann's constant is k, absolute temperature is T, that the collector current of the npn transistor Q2 at the state of receiving the background light only is $I_{L1}$, that the current flowing into a base of npn transistor Q3 when the reflected spotlight is incident is $\Delta I_{L1}$, that a current gain of the npn transistor Q3 is $h_{fe}$, and that saturation current of diodes D2 and D3 is $I_S$, the voltage $V_{O1}$ corresponding to the reflected spotlight can be expressed by the following equation.

$$V_{o1} = 2kT/q \cdot \ln((h_{fe} \cdot \Delta I_{L1} + I_{L1})/I_s) \tag{7}$$

Moreover, the voltage $V_{O2}$ generated from the noise elimination circuit connected to the output electrode 5 can be expressed by the following equation.

$$V_{o2} = 2kT/q \cdot \ln((h_{fe} \cdot \Delta I_{L2} + I_{L2})/I_s) \tag{8}$$

A difference between these voltages $V_d (= V_{o1} - V_{o2})$ can be derived from these two equations. The difference of these voltages is a logarithmic ratio of the photoelectric currents corresponding to the incident position of the reflected spotlight as shown in the following equation (9).

$$V_d = 2kT/q \cdot \ln\{(h_{fe} \cdot \Delta I_{L1} + I_{L1})/(h_{fe} \cdot \Delta I_{L2} + I_{L2})\}$$

Here, generally $$h_{fe} \cdot \Delta I_{L1} \gg I_{L1}, \quad h_{fe} \cdot \Delta I_{L2} \gg I_{L2}.$$

$$V_d = 2kT/q \cdot \ln(\Delta I_{L1}/\Delta I_{L2}) \qquad (9)$$

Therefore, the arithmetic circuit 3 calculates back the voltage difference $V_d$ from the logarithmic equation and then the distance to the object G can be determined.

However, according to the conventional technique, the following problems arose.

(1) Problem of voltage holding ability of capacitors

In order to hold the background light, off-set components or other noise components in the capacitor of FIG. 4, the switching device SW is necessary to be completely shut off when it is off; however, in practice, it is never completely shut-off, so that the charged voltage $V_h$ is decreased in accordance with discharging phenomenon. Therefore, the background light or off-set components are not reflected correctly.

Figure 5:
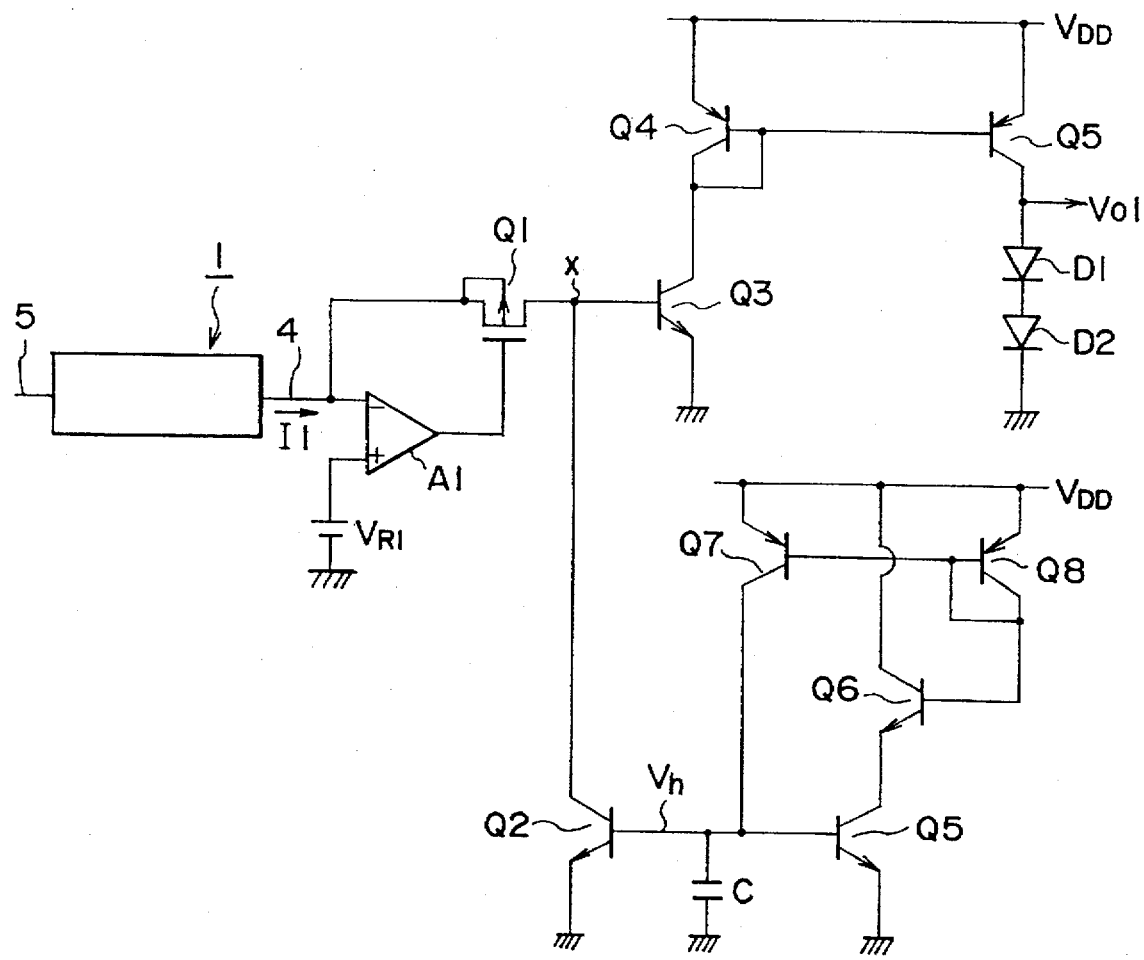
FIG. 5 is a circuit diagram of a conventional noise elimination circuit.

In order to solve such a problem, as shown in FIG. 5, a noise elimination circuit in which a current mirror circuit comprising npn transistors Q5 and Q6 and pnp transistors Q7 and Q8 is placed for compensating the discharged charges in the capacitor C has been proposed. This noise elimination circuit is disclosed in "Japanese Laid-Open application No. 59-142412 (142412/1984)". However, it is impractical to match the current gain $h_{fe}$ of these transistors Q2 and Q5. For this reason, it is not sufficiently effective.

(2) Problem caused by unmatched devices

It is hard to match current gain of transistors constituting the noise elimination circuit and as a result the ideal current mirror cannot be achieved. Because of these reasons, the noise elimination circuit with high accuracy cannot be achieved. Further, the operational amplifier A2 always generates the off-set voltage because of dispersion of devices, so that the base voltage of transistors Q2 and Q3 cannot be held in equal. Accordingly, currents flowing in transistors Q4 and Q5 are not a current mirror, which causes deterioration of accuracy.

For the solution to such a problem, one technique is disclosed in "Japanese Publication No. 4-34087 (34087/1992)". In this technique, a plurality of photosensitive units and a plurality of detectors corresponding to each of the photosensitive units are installed, and while the spotlight emission and the receiving process are repeated several times, the connection between the photosensitive units and the detectors are switched each time, so that the dispersion of devices is averaged. However, in such a technique, there exist problems that a circuit scale is large and a control timing is complicated.

(3) Problem of reverse logarithmical operation

As shown in the above equation (9), the position of the reflected spotlight can be obtained by the logarithmical equation. Since the position of the reflected spotlight has to be a real number and not a logarithmical number, reverse logarithmical calculation is required. However, if the reverse logarithmical calculation is processed with the logical circuit, the circuit will be large scaled and complicated. On the other hand, if the reverse logarithmical calculation is processed with the micro processor or others incorporated in the arithmetic circuit 3, repetitions on multiplication or division is required, so that time of the arithmetic operation will be long.

(4) Problem of integration

In order to stabilize the voltage $V_h$, a capacitor with a large capacitance of a few μ farads is required to be used, so that whole device cannot be integrated. In a case that it applies to a camera or others, it prevents the camera from being miniaturized.

On the other hand, according to the embodiment of the present invention as described above, as shown in the equations (1)–(9), since the position of the reflected spotlight incident on the photosensitive unit 1 can be determined without the reverse logarithm arithmetic like the conventional one, the distance to the object G is determined by the simple arithmetic process. Further, even the capacitors C1–C3 are used, they require no huge capacitance. The capacitors C1–C3 require capacitances of approximately 1 pF, which are suitable for the integrated circuit.

Thus, according to the present invention, first, charges are coupled by the integrators, counter circuit and capacitors to cancel out the background light components and other components, whereby only the light components of the object to be measured is obtained, so that the problem of voltage holding ability like a conventional one is solved. Second, accuracy does not depend on the dispersion of devices, so that the unnecessary components such as the background light components are eliminated in high accuracy. Third, in the conventional technique, the complicated arithmetic such as the logarithmical operation is required but in the present invention, the principle of charge coupling can be applied thereto, so that such complicated arithmetic processing is not required. Fourth, capacitors loaded in the first and second integrator have small capacity, so that the solid image pickup device which is suitable for ICs or LSI can be achieved.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A solid state image pickup device performing optical measurement achieving high signal to noise ratio by separating a light to be measured from unnecessary noise components, the solid state image pickup device comprising:

a photosensitive unit including a photoelectric conversion function;

a first integrator for one of integrating and not integrating a signal generated by said photosensitive unit, in a first capacitor connected between an input and output of said first integrator, on the basis of a first reset signal;

a second integrator for one of integrating or not integrating a signal in a third capacitor on the basis of a second reset signal;

a switching device and a second capacitor connected in series between an output of said first integrator and an input of said second integrator;

a counter circuit having a counting up function and a counting down function, said counter circuit being capable of holding a counted value corresponding to an intensity of light incident on said photosensitive unit; and a timing control circuit that monitors an output of said counter circuit and generates said first reset signal and said second reset signal.

2. A solid state image pickup device according to claim 1, wherein said timing control circuit also monitors an output signal from said first integrator.

3. A solid state image pickup device according to claim 2, wherein said counted value held by said counter circuit corresponds to an intensity of background light incident on said photosensitive unit.

4. A solid state image pickup device according to claim 3, wherein said timing control circuit controls said counting up function of said counter circuit in accordance with said output signal of said first integrator.

5. A solid state image pickup device according to claim 3, wherein said timing control circuit controls said counting down function of said counter circuit and monitors said output of said counter circuit so as to control said first and second reset signals such that an integration result of said second integrator corresponds to an intensity of light to be measured with said intensity of background light removed.

6. A solid state image pickup device according to claim 2, wherein said second capacitor has a second capacitance and said third capacitor has a third capacitance, said second and third capacitances being equal.

7. A solid state image pickup device according to claim 2, wherein said second capacitor has a second capacitance and said third capacitor has a third capacitance, said second and third capacitances being different.

* * * * *